Dec. 3, 1968 P. F. M. GAMBS 3,414,348
HEMISPHERICAL EYE TEST PERIMETER WITH COUPLED TEST
LIGHT SPOT AND RECORDING LIGHT SPOT PROJECTORS
Filed Oct. 4, 1962 3 Sheets-Sheet 3
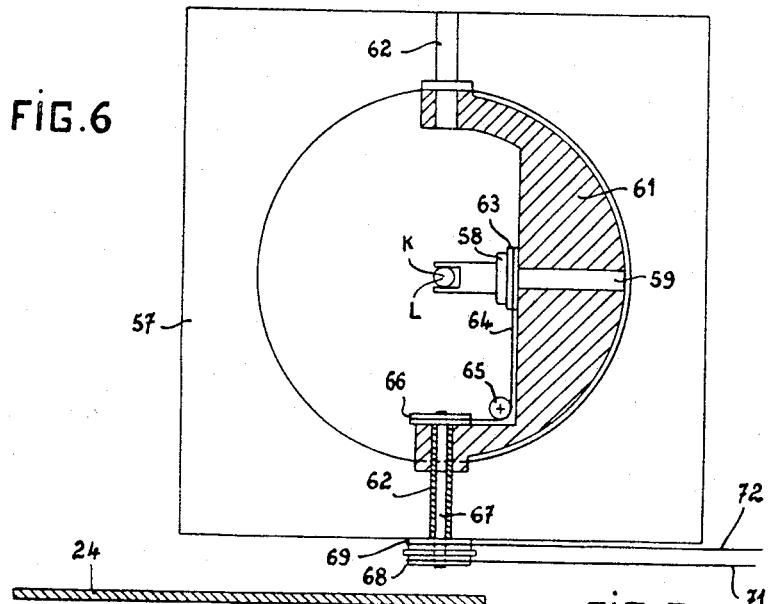
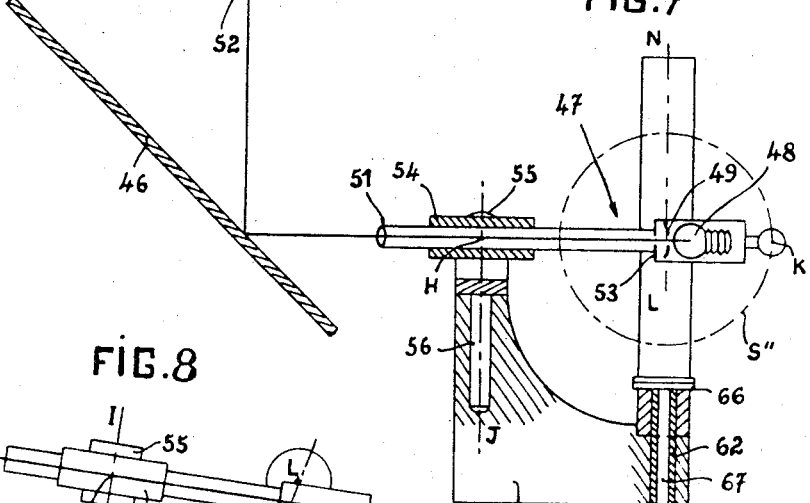
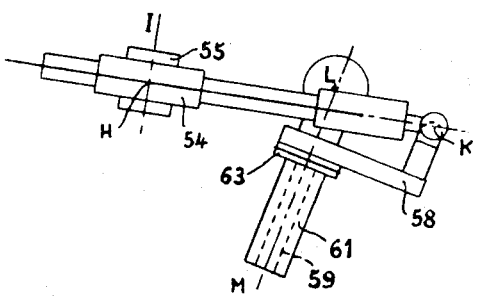
INVENTOR.
Paul Frederic Marie Gambs
BY
E. M. Squire
ATTORNEY United States Patent Office 3,414,348
Patented Dec. 3, 1968

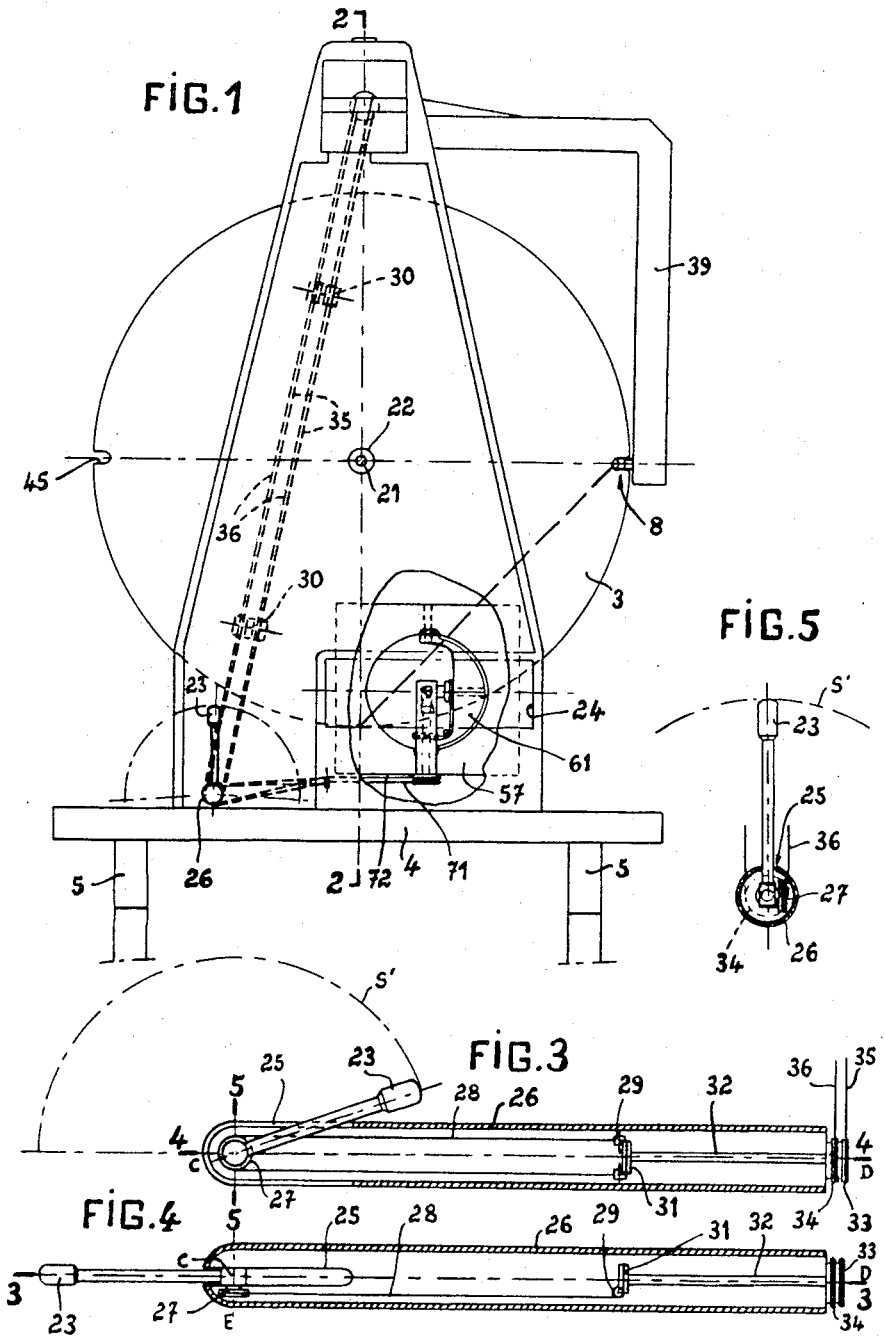

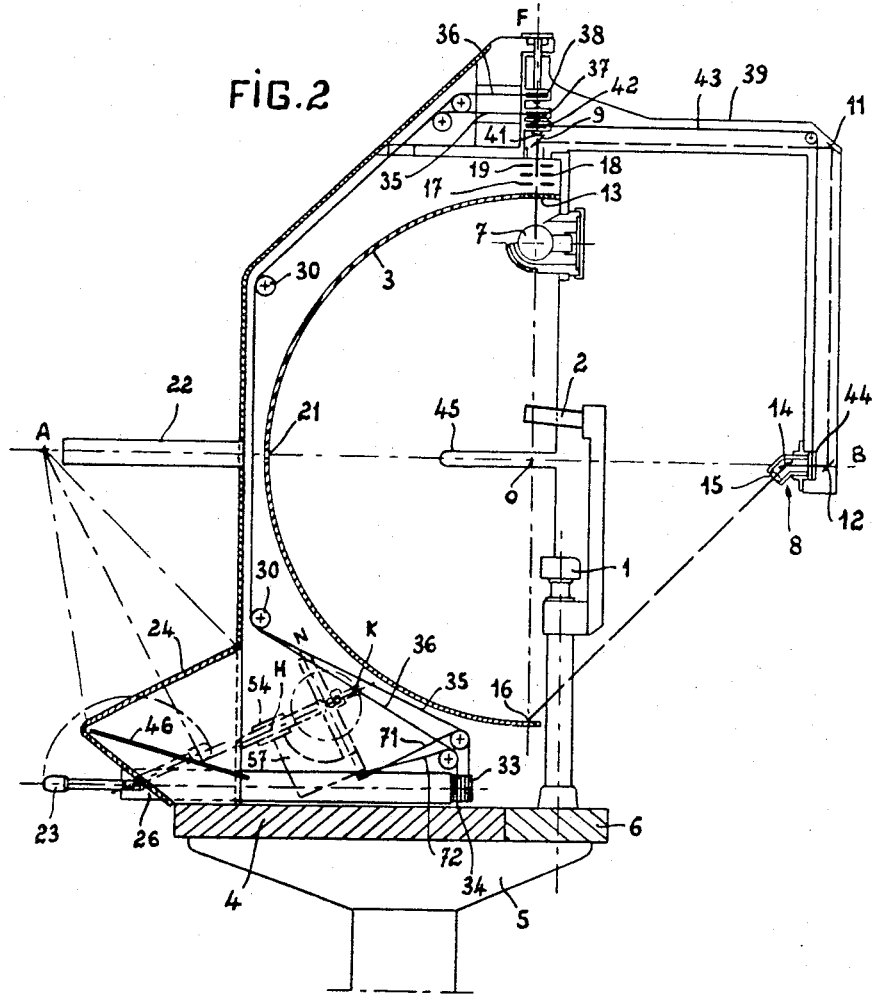

3,414,348
HEMISPHERICAL EYE TEST PERIMETER WITH COUPLED TEST LIGHT SPOT AND RECORDING LIGHT SPOT PROJECTORS
Paul Frédéric Marie Gambs, 15 Rue Jean Larrive, Lyon, France
Filed Oct. 4, 1962, Ser. No. 228,495
Claims priority, application France, Oct. 24, 1961, 41,961
4 Claims. (Cl. 351—24)

The present invention relates to optical perimeters for testing the retinal sensitivity of an eye to stimuli received from locations angularly spaced by various magnitudes and in various directions from its direct line of sight.

The device comprises a generally hemispherical projection surface and means for positioning the eye to be tested at the center thereof. A test spot projector is arranged to travel along a horizontal equatorial path between the vertically spaced poles of the hemispherical projection surface. The equatorial path of travel includes an extension of the generally semicircular equator of the projection surface.

The projector projects a test spot obliquely at an angle of substantially 45° with respect to a horizontal radius extending from the center of the projection surface. Rotation of the projection about the horizontal radius as an axis causes the test spot to travel along a meridian of the hemispherical projection surface, the particular meridian being determined by the position of the projector along its equatorial path of travel.

The position of the test spot is controlled by a lever which is pivotally secured to a horizontal member rotatable about its longitudinal axis. The lever is pivoted for movement about a transverse axis which intersects the longitudinal axis of the horizontal member perpendicularly at a fixed point. Cable and pulley means are provided for causing the test spot projector to move along its equatorial path of travel in response to rotation of the horizontal member about its longitudinal axis and to sweep along a particular meridian in response to pivotal movements of the control lever about the transverse axis.

The cable and pulley arrangement simultaneously controls a second spot projector which projects an observation spot on a plane surface. The observation spot moves radially on the plane projection surface simultaneously with movement of the test spot along a meridian and the direction of radial movement is determined by the position of the test spot projector along its equatorial path. The position of the observation spot provides a two-dimensional representation of the position of the test spot on the hemispherical projection surface for use by the person testing the eye under observation.

The invention will be better understood from the following specification with reference to the accompanying drawing.

Referring to the drawing:

FIGURE 1 is a diagrammatic rear view of a perimeter embodying the invention, the view being partly broken away to illustrate details of construction.

FIGURE 2 is a side view in sectional elevation of the perimeter shown in FIG. 1.

FIGURE 3 is an enlarged view in axial section of the control lever and horizontal member for moving the test spot.

FIGURE 4 is a view in axial section taken along the line 4—4 of FIG. 3 with the control lever positioned in axial alignment with the horizontal member.

FIGURE 5 is a transverse sectional view taken on the line 5—5 of FIG. 3.

FIGURE 6 is an enlarged rear view, partly shown in section, showing a rotor member for controlling the direction of radial movement of the observation spot in accordance with the equatorial position of the test spot and an arm which moves the observation spot in accordance with movements of the test spot along a particular meridian.

FIGURE 7 is a sectional view in side elevation looking leftwardly at FIG. 6.

FIGURE 8 is a fragmentary plan view with reference to FIGS. 6 and 7 showing the spherically movable member for controlling the position of the observation spot.

Referring to FIG. 1, the head of the patient is fixedly positioned by means comprising an adjustable chin rest 1 and a forehead rest 2. The chin rest 1 and the forehead rest 2 are adjusted in a manner such that the eye to be examined is located at the center O of the substantially hemispherical projection screen or dome 3 of the perimeter. In order to permit lateral centering adjustment from left to right and to shift operation from one eye to the other, the supporting plate 4 carrying the dome 3 is slidable over the cradle 5, the board 6 on which the head-rest and the chin rest are secured remaining stationary.

The projection surface of the dome 3 is illuminated by the lamp 7 which serves at the same time as a light source for the system 8 projecting the test spot. The light is transmitted from the lamp 7 to the projector 8 through a set of three mirrors 9, 11, 12. A condenser located at 13 concentrates at 8 the light from the filament of the lamp 7. The projector 8 comprises a mirror or reflecting prism 14 and an objective 15 forming on the dome at 16 the image of a diaphragm 17 of a variable diameter. Reference numerals 18 and 19 designate filters of a selectively changable opacity and color. It is thus possible to alter the test spot projected at 16 to provide desired characteristics suitable for the examination to be performed.

Central equatorial point 21 is continuously observed by the patient's eye to keep his line of vision stationary. At this point 21 may be secured for instance a very small mirror (not shown) returning towards the center O light received directly from the lamp 7.

A telescope 22 allows the operator whose eye is positioned along a horizontal radial axis at A, to examine the patient's eye located at the center O and to check, in particular, the direction of the patient's eye. This examination is performed through an opening at equatorial point 21 in the dome and in the small non-illustrated eye-illuminating mirror.

The movements of the test spot 16 are controlled by a lever 23 and are reproduced in two-dimensional polar coordinate projection on a flat screen 24.

The lever 23 illustrated in detail in FIGS. 3, 4 and 5 is movable in a slot 25 about a transverse axis CE. The slot 25 is formed in one end of a tube 26 rotatable in the frame of the apparatus about a longitudinal horizontal axis CD. The two axes of rotation of the lever 23 intersect at right angles at a fixed center point C. The movement of the free end of the lever 23 define the surface a sphere S' having its center at C and of which the lever defines at any moment one of the radii.

Angular displacement of the lever 23 about the transverse axis CE drives a pulley 27 which is connected by an endless cable 28 passing over idler pulleys 29, to drive a further pulley 31. An axially extending shaft 32, connects pulley 31 to drive an end pulley 33.

Augular displacement of the lever 23 about the longitudinal axis CD drives the tube 26 on which a further pulley 34 adjacent to and coaxial with the end pulley 33 is rigidly secured.

Any movement of the radial lever 23 may be resolved into two angular components lying in mutually perpendicular planes namely:

α—angular displacement about the longitudinal axis CD

β—angular displacement about the transverse axis CE

The rotation of the lever 23 about longitudinal axis CD drives the whole arrangement illustrated in FIGS. 3, 4 and 5 and consequently it produces a simultaneous rotation of the two coaxial pulleys 33 and 34 without any relative rotation of either pulley with respect to the other.

In contradistinction, the rotation of the lever 23 about the transverse axis CE causes rotation of the end pulley 33 independently of the pulley 34.

Two endless cables 35 and 36 passing over idler pulleys 30, connect the pulleys 33 and 34, respectively, with the pulleys 37 and 38 mounted coaxially for rotation on the vertical polar axis OF of the hemispherical dome 3.

The pulley 38, which responds to angular displacement of lever 23 about longitudinal axis CD, is rigidly secured to the arm 39 carrying the projecting system 8, along an equatorial path, which is thus correspondingly angularly displaced about the vertical polar axis OF.

The pulley 37, which responds to angular displacements of lever 23 about transverse axis CE, is connected by a spindle 41, a coaxial pulley 42, an endless cable 43 and a pulley 44, to cause rotation of the projecting system 8 about the horizontal radial axis OB. It is thus apparent that the movement α of the lever corresponds to the rotation of the arm 39 round the vertical axis OF, that is to a horizontal sweeping of the test spot over a circle of latitude which, in the position illustrated in FIG. 1, is reduced to the lower pole of the sphere; and the movement β of the lever corresponds to the rotation of the projecting system 8 about the radial axis OB, that is to a sweeping of the test spot along a meridian terminating at the poles defined by the vertical axis OF.

Finally, the movements of the lever 23 are faithfully reproduced by the test spot on the dome 3 since it should be remarked that the central position of the test spot at 21 corresponds to the vertical position of the lever illustrated in FIG. 1, while the position of the test spot on the lower pole of the sphere at 16 corresponds to the upright position of the lever 23 illustrated in full lines in FIG. 2.

A somewhat inaccurate control for the lower pole is not objectionable and the impossibility of reaching the upper pole is also of no importance since these two areas lie entirely outside the field of vision.

Furthermore, the tube 26 carries stops (not shown) which limit its rotation about its longitudinal axis CD and consequently the shifting of the arm 39 in a manner such that the projector 8 may just engage the closed end of either of the horizontal equatorial notches 45, at either limit of its travel. The depth of notches 45 is such that the test spot may be positioned, on the horizontal equatorial circle, at a point about 20° from the point 21 to be fixed by the eye, on the side opposite the notch thus engaged.

To utilize the other lateral half of the hemisphere, it is sufficient to displace the lever 23 through 180° about the transverse axis CE, which leads to a corresponding angular displacement of the test spot about the horizontal radial axis OB. The test spot is then projected outwardly of the dome 3. To return it onto the inner surface of the dome, it is sufficient to shift the now downwardly directed lever 23 back upwardly by displacement about the longitudinal axis CD. As soon as the lever 23 passes through a horizontal position, the projected test spot returns to the hemispherical projection surface facing the patient's eye.

As shown in FIG. 2, the projection beam reflected by the mirror 14 is obliquely inclined with respect to the horizontal radial axis OB at an angle of substantially 45°. Moreover, the mirror 14 is located on an extended generally semicircular equator of the hemispherical internal projection surface of the dome 3. Accordingly, a rotation of 180° imparted to the pulley 44 would cause the projected spot to sweep along a meridian extending from the lower pole at 16 to the upper pole at the condenser lens 13. It is not necessary, however, for the spot to travel throughout the full length of any meridian because the poles at 13 and 16 are well removed from the peripheral range of vision of an eye looking at point 21.

The apparatus for recording is illustrated in FIGS. 6, 7 and 8. A small optical projector 47 including a light source 48, a condenser 49 and an objective 51 projects at 52 from the plane reflecting mirror 46, onto a ground glass or translucent screen 24 the image of the diaphragm 53, which image is seen by the observer located at A (FIG. 2) as a luminous spot point.

The front cylindrical body of the projector 47 is longitudinal slidable in a sleeve 54. Sleeve 54 is pivotally mounted in a bifurcated support 55 rigid with a shaft 56 which revolves in a bore formed in the support 57 rigid with the frame of the apparatus. The sleeve 54 may thus revolve about the axes HI and HJ which intersect perpendicularly at a fixed point H (FIG. 8). Consequently, within the necessary limits of the movements to be described hereinafter, the projector 47 may assume any desired angular slope whereas the optical axis K–H of projection remains constantly constrained to pass through the stationary point H.

The point K is produced by a rotor 61 connecting the projector 47 with an arm 58 fitted at the end of a shaft 59 (FIG. 6) which revolves inside a bore of the rotor 61. Rotor 61 is supported by axially aligned sleeves 62 rotatable in the fixed support 57 rigid with the frame of the apparatus.

The axes of the shaft 59 and of the sleeves 62, respectively shown at LM (FIG. 8) and LN (FIG. 7) intersect prependicularly at L. Consequently the point K describes the sphere S" having its center at fixed point L.

Thus, the above described system produces the so-called polar equidistant projection of the sphere, S" being the projected sphere, H the projection pole, the screen 24 the projection plane, while K and 52 form two homogolous points, on the projected sphere and on the projection plane respectively.

To obtain the desired result, it is sufficient for the position and the movements of K on the sphere S to form at any moment the replica on a reduced scale of the movements of the test spot 16 on the spherical screen 3.

To this end, the rotary movement round the axis LM sweeping the vertical meridian lines of the sphere S" is controlled by a pulley 63 keyed to the shaft 59, the cable 64 passing over idler pulleys 65, the pulley 66, the shaft 67 extending through one of the sleeves 62 and the pulley 68 keyed to the shaft 67. On the other hand, the pulley 69 is rigid with one of the sleeves 62 and causes rotation of the rotor 61.

Consequently, the simultaneous shifting of the two pulleys 68 and 69 produces a sweeping of K over a circle of latitude of the sphere S" which lies in a plane perpendicular to the axis LN.

In contradistinction, a relative angular displacement of the pulley 68 with reference to the pulley 69 produces a sweeping of K along a meridian of the sphere S" passing through the axis LN.

It is sufficient to connect the two pulleys 68 and 69 respectively with the two pulleys 33 and 34 of the control system, by means of suitably guided cables 71 and 72 so as to obtain on the sphere S" a reproduction by the point K of the movements of the test spot 16 on the spherical screen 3 and consequently a reproduction of said movements by the spot 52 on the screen 24 in accordance with the principle of polar equidistant projections.

By applying over the screen 24 a conventional chart printed on an appropriate scale on sufficiently translucent paper, it is possible at any moment to ascertain and to define on the chart the position of the test spot 16 on the spherical screen 3.

When the point K passes in front of L, the spot 52 is out of focuse and becomes less well defined, which shows the observer that the test spot has moved outside the dome 3.

The synchronization of the projection of the test spot with the recording spot requires simply a suitable selection of the diameters of the transmission pulleys, and a suitable initial adjustment of the position of the cables stretched over said pulleys.

While I have shown and described what I believe to be the best embodiment of my invention, it will be apparent to those skilled in the art that various changes and modifications may be made therein without departing from the spirit and scope of the invention as defined in the appended claims.

What I claim is:

1. A perimeter of the class described, comprising: means defining a substantially hemispherical projection surface extending between vertically spaced poles with a substantially semicircular horizontal equator; first spot projecting means movable along an equatorial path including an extension of said equator, said first projecting means projecting said spot obliquely with respect to a horizontal radius passing through said first projecting means; means for rotating said first projection means about a horizontal radial axis, the obliquity of said projection causing said spot to move along a particular meridian of said projection surface determined by the position of said source along said equatorial path; means defining a plane projection surface; second spot projection means movable in a spherical path; means constraining the optical axis of said second projection means to pass continuously through a fixed point and to project a spot on said plane surface; means constraining said first and second spot projecting means to move in unison through equal angular displacements along equatorial paths; and means constraining said first projection means to be rotated about said radial axis and said second projection means to be displaced along a meridian in unison with equal angular displacements; and means for selectively producing said angular displacements, said means for producing said angular displacements comprising an elongated member rotatable about its horizontal axis; a control member pivoted to said elongated member for angular displacement about a transverse axis perpendicularly intersecting said longitudinal axis at a fixed point; means responsive to pivotal movements of said control member about said longitudinal axis connected to said first and second spot projection means to cause said displacements along equatorial paths; and means responsive to pivotal movements of said control about said transverse axis connected to said first and second spot projection means to cause said rotation of said first projection means and said displacement of said second projection means along a meridian.

2. A perimeter according to claim 1, further comprising an observation station located midway along said semicircular equator and means for positioning an eye to be examined at the center of said hemispherical projection surface.

3. A perimeter according to claim 1, further comprising means defining slots for receiving said first projection means and extending into said means defining said hemispherical surface equatorially from the ends of said equator, said first projection means protruding into the interior of said hemispherical surface when said first projection means is positioned in either of said slots; and means limiting rotation of said elongated member about its longitudinal axis for confining said movement of said first projecting means along said equatorial path to a path extending intermediate the ends of said slots.

4. A perimeter of the class described, comprising: means defining a substantially hemispherical projection surface located at one side of a vertical axis, said surface having a generally semicircular horizontal equator; a spot projection means movable along an equatorial path defined by an extension of said semicircular equator, said first spot projection means being rotatable about an axis defined by a horizontal radius passing through said equatorial path, said spot being projected obliquely with respect to said radius for movement of said spot along a meridian of said hemispherical surface by said rotation of said projection means about said horizontal axis; an elongated member rotatable about its longitudinal axis; a control member pivoted to said elongated member for rotation about a transverse axis intersecting said longitudinal axis perpendicularly at a fixed point; first pulley and cable means transmitting angular displacements of said elongated member about its longitudinal axis to said projection means for producing corresponding angular displacements thereof along said equatorial path; second pulley and cable means transmitting angular displacements of said control member about said transverse axis to said projection means for producing corresponding angular displacements thereof along a particular meridian of said projection surface determined by said first pulley and cable means; third pulley and cable means connected to receive angular displacements from said first pulley and cable means; fourth pulley and cable means connected to receive angular displacements from said second pulley and cable means; a rotor member driven by said third pulley and cable means; an arm carried by said rotor member with one end portion thereof arranged for rotation about an axis perpendicular to and intersecting the rotational axis of said rotor member; said arm being driven by said fourth pulley and cable means; further spot projection means connected for displacement by the other end portion of said arm; means constraining the optical axis of said further spot projection means to pass continuously through a fixed point; and means defining a plane projection surface upon which a spot is projected by said further spot projection means.

References Cited

UNITED STATES PATENTS

| | | | |
|---|---|---|---|
| 1,601,394 | 9/1926 | Hunsincker | 351—4 |
| 2,441,031 | 5/1948 | Papritz | 351—24 |
| 3,071,040 | 1/1963 | Jayle | 351—24 |

DAVID H. RUBIN, *Primary Examiner.*